June 11, 1957 L. J. PIRCON 2,795,139
MEANS FOR SENSING AND RECORDING THE TEMPERATURE
OF THE CONTENTS OF LARD RENDERERS AND THE LIKE
Filed June 14, 1954 2 Sheets-Sheet 1
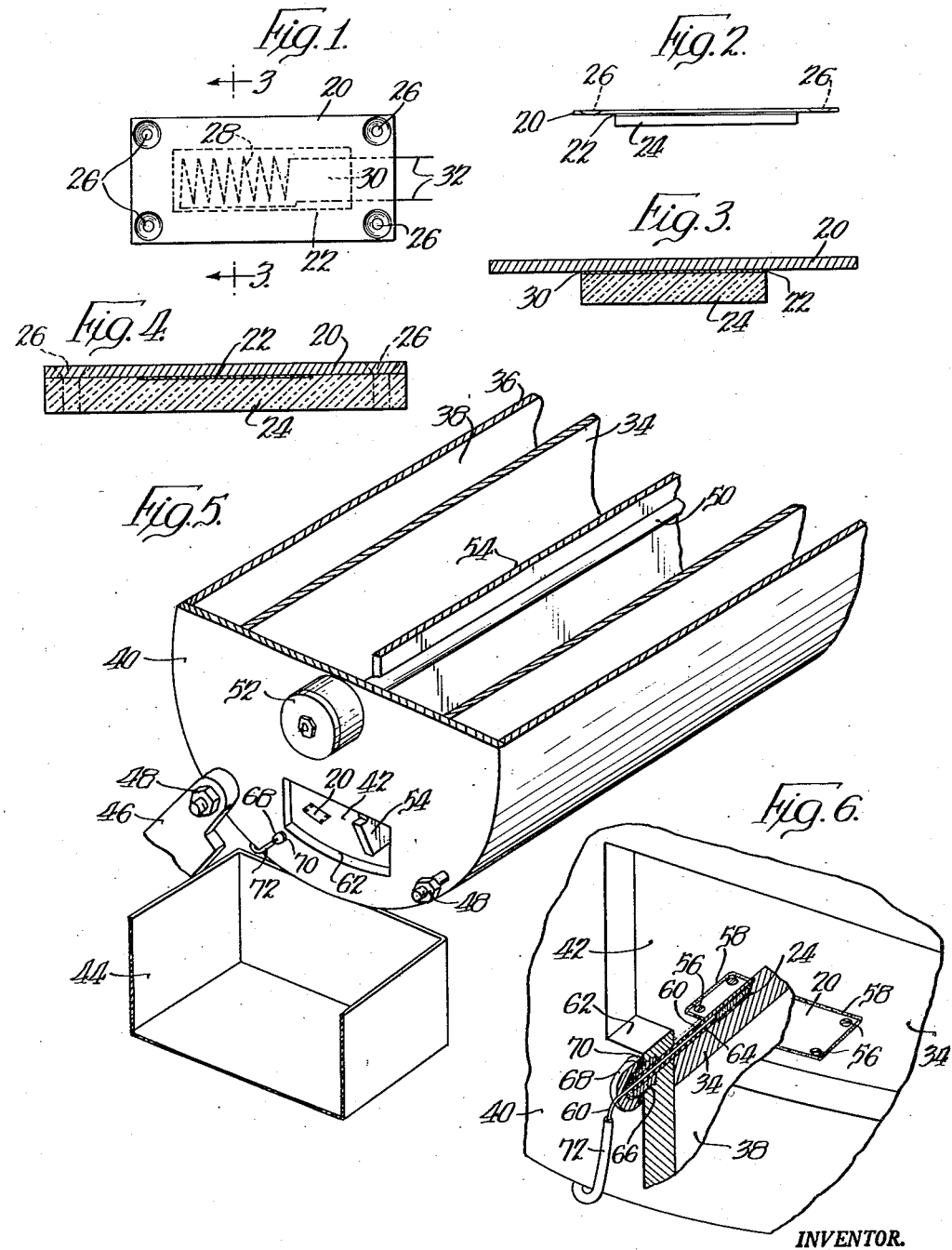
INVENTOR.
Ladislav J. Pircon
BY
Attys.

June 11, 1957 L. J. PIRCON 2,795,139
MEANS FOR SENSING AND RECORDING THE TEMPERATURE
OF THE CONTENTS OF LARD RENDERERS AND THE LIKE
Filed June 14, 1954 2 Sheets-Sheet 2
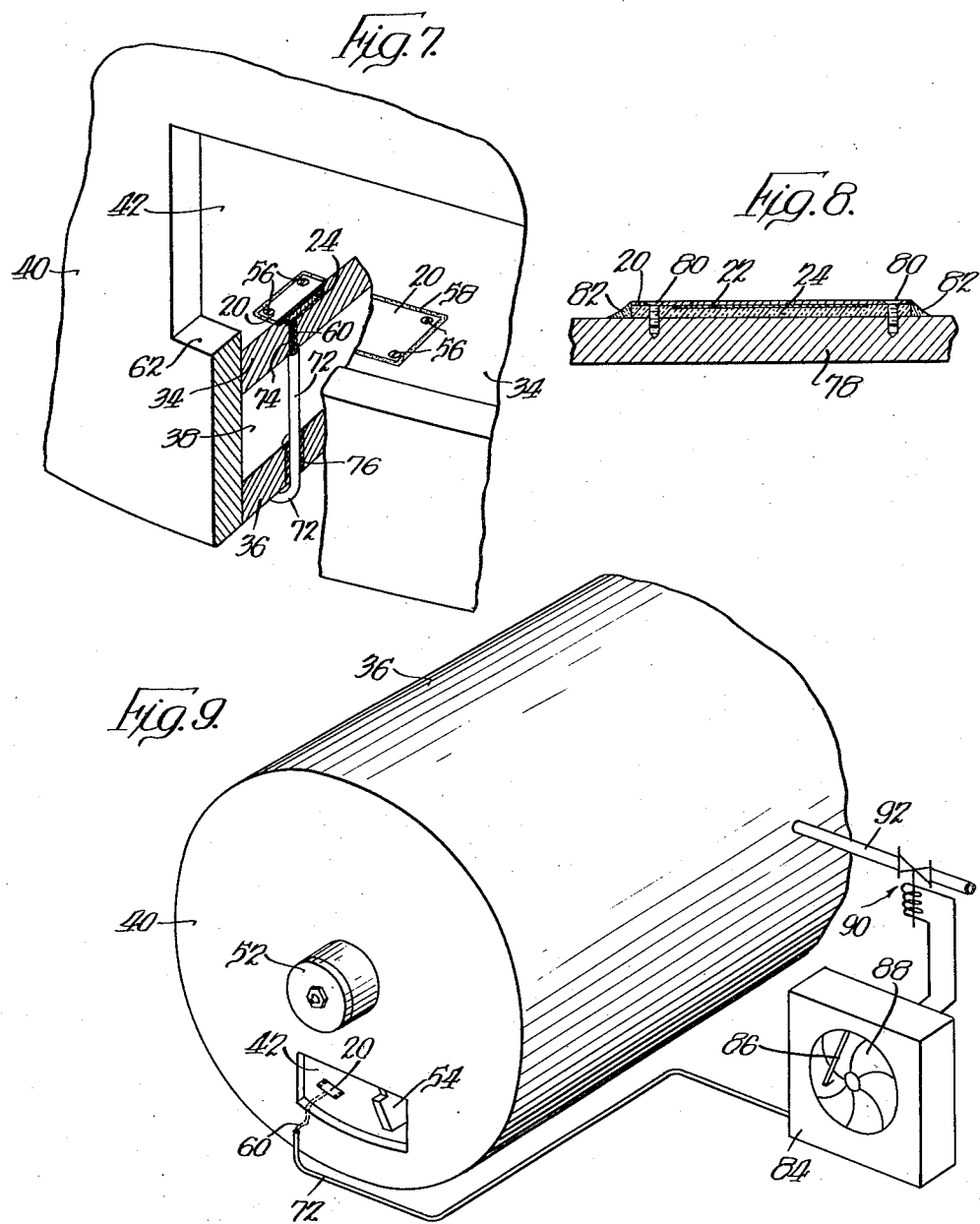
INVENTOR.
Ladislav J. Pircon
BY
Attys.

United States Patent Office 2,795,139
Patented June 11, 1957

2,795,139

MEANS FOR SENSING AND RECORDING THE TEMPERATURE OF THE CONTENTS OF LARD RENDERERS AND THE LIKE

Ladislav J. Pircon, Berwyn, Ill., assignor to A. W. Brickman, Victor Conquest, Frank J. Madden, Wrisley B. Oleson, and Emery T. Filbey, all of Chicago, Ill., as trustees for the benefit of American Meat Institute Foundation, Chicago, Ill., a non-profit corporation of Illinois Application June 14, 1954, Serial No. 436,374

1 Claim. (Cl. 73—362)

The present invention relates to means for sensing and indicating, recording and/or controlling the temperature of the contents of vessels, such as lard renderers and the like, and particularly, to means for sensing directly the temperature of the vessel contents, as opposed to the temperature of the vessel or the walls thereof.

In the rendering of lard, both edible and inedible, but particularly edible lard, it is essential that the temperature of the contents of the renderer be very accurately measured to insure proper and complete rendering. Relatively slight variations from established standards can be ruinous. However, temperature sensing devices previously proposed have suffered the distinct disadvantage that such devices are not fully capable of sensing solely the temperature of the contents of the lard renderer, but necessarily sense, at least to a very substantial if not entire extent, the temperature of the rendering vessel. Also, previously proposed devices have suffered the disadvantages that the same are very difficult and expensive to mount and maintain, and may readily be damaged.

The rendering of lard may be carried out either "dry" or "wet." In drying rendering, the apparatus employed comprises an inner vessel surrounded by a steam jacket. Suitably, the renderer may comprise a pair of concentric cylinders defining an annular steam jacket therebetween, the inner cylinder comprising a lard containing vessel within which an agitator is movable to insure proper rendering. Steam is introduced solely into the steam jacket, not into the inner vessel, to heat the contents of the inner vessel. Wet rendering involves the direct injection of steam into the lard or fat containing vessel, so that a steam jacket is not essential, but may be employed if desired. In the rendering of inedible lard, bones are introduced directly into the renderer and forcibly moved about therein by the agitator. To clean an inedible lard renderer, bones, scrap iron, tin cans, bolts, nuts and other scrap materials are introduced into the inner vessel and agitated therein to scrape the walls of the vessel clean. Occasionally, edible lard renderers may be cleaned in the same manner. Under these circumstances, it is essential that the temperature sensing device be very sturdy in construction and be so mounted as not to protrude into the vessel. Accordingly, the temperature sensing device should properly be located in the wall of the vessel. Heretofore, it has been conventional to bore a large diameter hole in the wall of the renderer. In jacketed renderers, aligned holes are provided in the walls of both vessels. Then, the temperature sensing device is located in the wall of the inner vessel, and the transmission means of the device is extended through the steam jacket (if provided) to the exterior of the renderer. The devices as employed heretofore have comprised thermo-couples, thermo-filled devices, electric resistance units, and the like, all of which have been of large size and shielded from the interior of the renderer by a relatively thick protective plate forming a portion of the wall of the vessel. Due to their size and mounting, these devices have been sensible not only to the temperature of the contents of the vessel, but also to the temperature of the walls, as transmitted directly to the temperature responsive means, and to the temperature of the steam in the jacket (or to ambient temperature conditions in the absence of a steam jacket), as transmitted along the transmission means of the device to the temperature responsive means thereof, or directly to the fluid or the like in the transmission means. Obviously then, prior devices have been incapable of accurately measuring the temperature of the vessel contents. Also, it is to be appreciated that the devices have been cumbersome, and difficult and expensive to install. Furthermore, and of very substantial disadvantage, is the fact that the devices have not been adequately protected from damage due to the shocks and blows imported thereto by the bones and other scrap materials introduced into and agitated within the renderer, and from damage due to internal steam pressure in the renderer during "wet" rendering.

The present invention has for its object the provision of an improved temperature sensing device that is sensible, in practical effect, solely to the temperature of the vessel contents, that is of small size and readily and economically installed and maintained, and that includes means insuring complete protection of the sensing element.

Another object of the invention is to provide an improved sensing device overcoming the disadvantages of prior devices and affording the distinct advantages of long life, practicality and efficiency.

While the present invention has particular applicability to lard renderers, especially dry renderers for the rendering of edible lards, and is described principally herein as so applied, it is an object of the invention to afford an improved temperature sensing device applicable to all vessels wherein accurate measurement of the temperature of the contents of the vessel is desired.

In accordance with the present invention, I provide an improved temperature sensing device comprising, in its preferred embodiment, a thin metallic protective plate of high heat conductivity, a resistance unit or tab of very thin section mounted on one surface of the plate, and a relatively thick layer of insulation material backing up the resistance tab. In a practical commercial embodiment, the resulting assembly is only ⅛" thick, with the insulation comprising more than one-half of the thickness. For use in sensing a wide range of temperatures, the surface area of the device, for installation in lard renderers, for example, need be only 2¾₁₆ square inches, suitably a rectangle 1" x 2³⁄₁₆". The protective plate may exhibit the surface area stated and need be only ¹⁄₃₂" thick. The resistance tab itself, in the embodiment referred to, need only be of a size ½" x 1½" x .003", and is comprised of a resistance wire embedded in a plastic material, such as Bakelite. The insulation material may be of the same size as either the protective plate or the resistance tab, depending upon the mounting employed, and preferably of a relatively dense structure fully to insulate the resistance tab and protect the tab from damage.

Further according to the invention, the temperature sensing device as above described may be mounted flush with the wall of a vessel, in the lard rendering application referred to, for example, solely by forming a shallow recess in the interior surface of the wall, securing and sealing the device in the recess, forming the most expedient path of egress for the leads of the resistance tab, and disposing the leads in said path. As thus mounted the device completely fills but does not protrude from the recess, the protective plate thereof being flush with the wall. The plate shields the resistance tab from direct contact with the contents of the vessel and the insulation completely fill the recess so that any blows or shocks imparted to the device are cushioned and absorbed by the insulation without damage to the resistance tab. The insulation further insulates the resistance tab from the walls of the vessel to eliminate sources of possible error in temperature recording. The leads of the tab are so fine as to be incapable of transmitting any substantial amount of heat to the tab, and further, are insulated to reduce to a minimum any such tendency. Also, the size of the resistance tab, and the length of wire therein, is such that any small amount of heat transmitted through the leads is spread over a large area, and thus has no significant effect on the temperature recording. The protective plate, being thin and metallic, and exposed directly to the contents of the vessel, conducts the heat of the content to the resistance tab, whereby the tab senses directly and solely the temperature of the contents of the vessel.

In vessels wherein the temperature sensing device of the invention would not be subject to the violent abuse occasioned in lard renderers, the device, because of its exceedingly thin section, may optimumly be mounted directly on the surface of the wall, in a most convenient manner, to afford the same advantages as pointed out above, and particularly the advantages of complete protection from damage, ease of mounting, and sensing directly the temperature of the vessel contents.

Other advantages and objects of the invention will become apparent in the following detailed description of preferred embodiments of the invention.

Now, in order to acquaint those skilled in the art with the improved temperature sensing device of my invention, and the improved manners of mounting the same, I shall describe, in connection with the accompanying drawings, preferred embodiments of the temperature sensing device and preferred manners of mounting the same.

In the drawings, wherein like reference numerals refer to like parts:

Figure 1 is a plan view, actual size, of one embodiment of the temperature sensing device of the invention;

Figure 2 is a side elevation, actual size, of the device shown in Figure 1;

Figure 3 is a cross-sectional view, on a scale enlargement of three times, of the device, the view being taken substantially on line 3—3 of Figure 1;

Figure 4 is a view similar to and on the same scale as Figure 3 of a modification of the temperature sensing device;

Figure 5 is a perspective view, partly in section, of a vessel, such as a lard renderer or the like, showing generally the association of the temperature sensing device of the invention therewith;

Figure 6 is a fragmentary perspective view, partly in section, on an enlarged scale, showing one manner of mounting the temperature sensing device in the wall of a vessel;

Figure 7 is a view similar to Figure 6 showing a second manner of mounting the temperature sensing device in the wall of a vessel;

Figure 8 is a sectional view showing, in actual size, the manner of mounting the temperature sensing device directly on the surface of a vessel wall; and Figure 9 is a somewhat diagrammatic, perspective view of the complete assembly of the temperature sensing device, a vessel, temperature indicating, recording and/or control means, and means actuated by the control means to vary the temperature of the vessel.

Referring now to the drawings, and particularly to Figures 1 to 3, I have shown a preferred embodiment of the temperature sensing device of the invention as comprising a thin protective plate 20, a temperature responsive unit or element 22 secured to the lower surface of the plate, and a layer of insulating material 24 backing up the unit or element 22. The protective plate 20 of the assembly may be selected of a wide variety of materials, depending upon the use of the device, but is preferably metallic because of the strength and relatively high heat conductivity characteristics of metal. The plate may be selected from a wide variety of metals. For installation in renderers of edible lard, I prefer to employ stainless steel because of its strength and non-corroding and non-tainting characteristics. For inedible lard renderers, I prefer to employ a tougher steel, for example, a tungsten alloy steel, because of its greater resistance to abrasion, which is a substantial problem in the rendering of inedible lards. In either case, the steel plate need not be thicker than approximately $\frac{1}{32}$", and in installations wherein abrasive wear, shocks and blows are very light or non-existent, even thinner plates may be employed. As shown, the plate is preferably larger than the temperature sensing unit or element 22, to accommodate mounting of the device by means of fasteners without necessity for passage of the fasteners through the element. The plate may suitably be provided adjacent the four corners thereof with countersunk holes or apertures 26 to facilitate mounting of the device by means of fasteners. To accommodate such mounting and the holes 26, the size of the plate 20, in relation to the size of the preferred temperature sensing element to be described hereinafter, may suitably be 1" wide and 2$\frac{3}{16}$" long.

According to the present invention, the temperature sensing element or unit 22 preferably comprises an electric resistance tab in the form of a relatively long length of wire 28 disposed in a zigzag path and embedded in a plastic mounting material or block 30, such as Bakelite or the like, and including leads 32 extending outwardly of the mounting material or block 30. The wire 28 is preferably of an exceedingly small diameter, to accommodate a long length of wire in a small space, and the plastic block 30 is preferably of a size just to enclose the zigzag portions of the wire. In a commercial embodiment I have found particularly practical and efficient, the tab 22 need only be 1½" long, ½" wide and .003" thick. A resistance tab conforming exactly to the desired specifications is marketed commercially by Baldwin, Lima, Hamilton Corporation, of Philadelphia, Pennsylvania.

The resistance tab 22 may be secured to the plate 20 centrally thereof in any desired or customary manner to effect face to face contact of the two and good heat conducting characteristics therebetween. I prefer, as being the most expedient form, to glue or cement the tab 22 to the plate. While any customary glue or cement may be employed, for example Bakelite cement, I prefer further to cement the tab to the plate by means of an ethoxyline resin sold under the name "Araldite" by Ciba Company, Inc., of New York, New York. This cement is highly resistant to heat and maintains an effective bond between the tab and the metal plate. Since only a thin layer, or a few thin dabs of cement are required, good heat conductance is maintained.

The insulation material 24 employed may be of any desired character and need only be of a thickness adequately to insulate the side of the resistance tab 22 to which it is secured. According to the invention, the insulating material serves to cushion and absorb shock and blows to protect the resistance tab from damage, and I therefore prefer to employ a relatively dense and sturdy insulating material, preferably asbestos. With dense insulating materials, and particularly with asbestos, only a relatively thin layer of insulation is required. In the embodiment of the invention disclosed, I determined upon an end design of the temperature responsive device wherein the overall thickness would be $\frac{1}{8}$". With this design, and a plate thickness of $\frac{1}{32}$", and a tab thickness of .003", the resultant layer of asbestos is approximately .091" thick, which I have found to be entirely adequate in the installations I have made and the tests I have conducted. In the embodiment of the invention shown in Figures 1 to 3, the layer of asbestos is of a size to cover the bottom surface only of the resistance tab. I have found this arrangement to be highly satisfactory. While a small amount of heat could, with this embodiment, be transmitted from the walls of the vessel to the metal plate 20 and thence to the resistance tab 22, such transmission would be so small, and would be mitigated to such extent by direct contact of the contents of the vessel with the plate 20, that there would be no significant error introduced. However, if an extremely high degree of mitigation is desired, the embodiment of the invention shown in Figure 4 may be employed. The Figure 4 embodiment, which is otherwise identical to that of Figures 1 to 3, incorporates a layer 24 of insulating material that extends over the full area of the plate 20 fully to encompass and enclose the tab 22. As shown in dotted lines, the dense insulating material 24 may suitably be provided with holes aligned with the mounting holes 26 provided in the plate 20. With the Figure 4 embodiment, transmission of heat from the vessel walls to the temperature sensing tab could be accomplished only through the very limited path afforded by the fasteners employed to mount the device. In either embodiment, the layer of insulating material, 24 is preferably cemented to the back of the tab 22.

Referring now to Figure 5, there is shown therein a vessel representative of lard renderers. I have preferred to show a vessel of the dry renderer type for the rendering of edible lards as this is a specific installation for which the device of my invention has been conceived. Also the mounting problems are the most difficult in steam jacketed dry renderers. However, it is to be appreciated that anyone acquainted in the art may readily apply the specific teachings hereof to a wide variety of vessels, jacketed or unjacketed, for a wide variety of purposes. As shown, the dry renderer comprises a cylindrical inner vessel 34 for containing lard and the like, a concentric outer cylinder or vessel 36 defining with respect to the inner vessel an annular steam jacket 38, an end closure plate (not shown) at one end of the cylinders and an end closure plate 40, which latter closure plate has an opening 42 therein adjacent the bottom of the inner vessel 34 to accommodate discharge of rendered lard into a tank or trough 44. The opening 42 in the vessel is adapted to be closing during rendering by means of a door 46 (fragmentarily shown) which is associated with and locked in closed position by means of the studs and nuts 48 in a customary manner. An agitator shaft 50 extends axially through the inner cylinder and is journalled at its opposite ends in bearings 52 (one shown) in the end closure plate of the renderer. The shaft 50 is adapted to be rotated and/or oscillated in any manner conventional in the art, and the same carries a plurality of agitator blades 54 which extend generally radially of the shaft to adjacent the walls of the inner vessel 34. Generally, the blades 54 terminate at least 3/16" from the vessel wall. In Figure 5, I have shown, somewhat schematically, a suitable location of the temperature sensing device, as indicated at 20, within a lard renderer. In such position, the temperature sensing device is disposed at the lower portions of the renderer to be immersed in lard, thus to sense the temperature of the lard irrespective of the method of rendering, i. e., wet or dry, and is located adjacent the outlet 42 of the renderer to be subject to the temperature of the rendered lard in the final stages of rendering.

Two suitable mountings of the temperature sensing device, in the general location indicated in Figure 5, for lard renderers and the like, are shown in Figures 6 and 7, wherein, respectively, the leads 32 of the resistance tab are led generally longitudinally and radially from the renderer. In both figures, the temperature sensing device is of the character shown in Figures 1 to 3 and is disposed in a two step shallow recess formed in the inner surface of the wall 34 of the vessel. The recess may be milled, drilled, or otherwise formed in the wall in an economical and rapid manner, since the same need only by 1/8" in depth. The first step of the recess comprises a very shallow recess of approximately 1/32" in depth within which the plate 20 is adapted to be received, and the second step comprises a centrally disposed continuation of the first step of a depth corresponding to that of the combined thicknesses of the insulation 24 and the tab 22. Both steps of the recess are preferably slightly larger in area than the corresponding portions of the temperature sensing device to insure complete reception of the device within the recess. Any clearance may then be filled in completely with cement. Holes are drilled and tapped in the wall 34 of the vessel, within the first step of the recess, in alignment with the holes 26 in the plate 20. The temperature sensing device is then secured in the shallow recess in the wall 34 by means of screws 56 or like fasteners. Also, cement, such as Bakelite cement or "Araldite," may be used in addition to the fasteners and to fill in any clearances or gaps. In particular, "Araldite," Bakelite cement, or the like, is employed to fill in completely and smoothly, the crevice between the plate 20 and adjacent surfaces of the wall 34, as is indicated at 58. In the resultant assembly, the plate 20, the screws 56 and the cement 58 are perfectly flush with the wall of the vessel 34. The temperature sensing device does not protrude from the wall of the vessel, and there are no crevices within which lard may lodge, whereby the device maintains sanitary conditions and does not interfere with the usual operation of the renderer. Due to the short length of the device, the curvature of the vessel wall is of no significance in the mounting of the device. The leads 32 of the resistance tab 22 are disposed within and insulated with respect to a stainless steel needle 60, which may be led from the renderer in either of the manners shown in Figures 6 and 7, or in any other convenient manner.

As shown in Figure 6, the stainless steel needle 60 may be led from the renderer generally longitudinally of the renderer. In commercial renderers, the opening 42 in the end closure 40 thereof is usually disposed slightly above the bottom of the wall of the inner vessel 34, to define a lip portion 62 on the end closure 40 overlying the wall 34. With such renderers, a hole may be bored directly through the lip portion 62 and be continued in the form of a shallow channel in the inner surface of the wall 34 directly into communication with the recess in which the temperature sensing device is positioned. The lead needle 60 is then laid in this channel and led through the bore in the lip portion 62 to the exterior of the renderer. Preferably, the needle is cemented into the channel in the wall 34 and in the bore in the lip portion 62 by means of cement, preferably "Araldite," as indicated at 64. If the cement is applied in a relatively thick layer as shown, the same serves to assist in insulating the resistance tab leads against heat variations other than those to which the tab 22 is subjected, namely, the heat variations of the contents of the vessel. Thus, the leads 32 and the needle 60 are insulated to prevent transmission of heat along the leads to the resistance tab. Further, the leads, being of exceedingly small diameter, are incapable of transmitting a substantial amount of heat of the tab 22, and any heat that would be transmitted would be spread over such a large area in the tab as to have no significant effect on the temperature measurement made.

At the exterior of the lip portion 62, I prefer to tap a pipe fitting 66 into the end closure 40 in alignment with the bore in the lip 62 and to secure an apertured cap 68 to the fitting. The needle 60 is led through the fitting and cap, and the fitting and cap are packed with cement, insulating material, or other packing to seal the avenue of egress of the needle against flow or leakage of lard. To complete the seal, a sealing ring 70 is confined between the cap 68 and the end face of the closure 40. To the exterior of the cap, the needle 60 is led away from the renderer in any convenient manner, and the same is preferably covered with an insulating shield 72.

Referring to Figure 7, an alternative manner of conducting the lead enclosing needle 60 of the temperature sensing device from the renderer is shown as residing in the adoption of a generally radial path of egress. As shown, a pair of aligned, small diameter holes may be drilled in the walls 34 and 36 of the renderer, the hole in the wall 34 being of a smaller diameter than the hole in the wall 36 and communicating directly with the recess within which the temperature sensing device is positioned. The needle 60 is conducted through the aligned holes in the two walls and is preferably cemented in the hole in the wall 34 as indicated at 74, in the manner described hereinbefore. Exteriorly of the wall 34, within the steam chamber 38 and continuing from the wall 34 outwardly, the needle 60 is enclosed within the shield 72 which insulates the needle and resistance tab leads in the manner previously described. Preferably, the shield 72 is cemented in the hole in the wall 36, as indicated at 76, and is led from the renderer to the indicating, recording and/or control apparatus in any convenient manner.

In lard renderers, it is preferred to dispose the temperature sensing device in a recess in the wall of the vessel with the protective plate thereof flush with the wall, in the manner described, because of the extraneous materials that are or may be introduced into the vessel, which materials forcibly scrape the inner surfaces of the inner vessel 34 and impart substantial blows to the temperature sensing device. With the device disposed within a recess, damage from the scraping action is avoided. With respect to blows imparted to the device, it is to be observed that the insulation material completely fills the recess and thus will not accommodate such flexure of the resistance tab and protective plate as would damage or impair the function of either. Shocks and blows are cushioned and absorbed by the insulation, thus to insure long and efficient service of the temperature sensing device. Also, the insulating material, which completely fills the recess, insures protection of the tab against internal pressures in the renderer. These pressures may vary between the extremes of from about 14" vacuum to about 100 p. s. i. on the direct injection of steam in "wet" rendering. In addition to the foregoing, the device is of extremely small size and readily and economically mounted in the renderer. Insulation of the device from the wall of the vessel and the steam chamber or jacket is highly efficient and eliminates subjection of the temperature sensing device to extraneous temperature variations and conditions. The protective plate, being thin and of high heat conductivity, insures that the resistance tab senses solely and accurately the temperature of the contents of the vessel. In view of these considerations, it is apparent that the present invention affords substantial advantages in the art over prior proposals.

While the embodiment of the temperature sensing device shown in Figures 1 to 3 has been shown and described in conjunction with Figures 6 and 7, it is apparent that the embodiment of the temperature sensing device shown in Figure 4 could as well be employed and mounted substantially in the manner described.

As previously observed, the present invention has particular applicability to lard renderers, but is not limited to such application. In vessels wherein the vessel itself and the contents thereof are not subject to such severe agitation, scraping and the like, the temperature sensing device of the invention may be mounted directly on the wall of the vessel to protrude therefrom. Even if such vessel included an agitator, such as that indicated at 50 and 54 in Figure 5, the temperature sensing device could be mounted directly on the vessel wall, since the agitator blades terminate at least 3/16" from the wall of the vessel. The temperature sensing device of the invention, in its preferred embodiment, being only 1/8" thick, adequate space is provided for the mounting of the device. A mounting of this character is shown in Figure 8, which is a full scale disclosure of the device. For this type of mounting, the embodiment of the temperature sensing device shown in Figure 4 is preferred, but it is apparent that the embodiment of Figures 1 to 3 may be employed as well. As shown, the temperature sensing device is positioned on the wall 78 of the vessel with the lower surface of the insulating material 24 in direct contacting engagement with the wall. If desired, the insulating material may be cemented to the wall by "Araldite" cement or the like. Preferably though, fasteners 80 are employed to secure the temperature sensing device to the wall. To complete the assembly, cement, such as "Araldite" or Bakelite cement, is employed to form a fillet or taper 82 merging the upper surface of the plate 20 with the inner surface of the vessel wall. Either cement affords a particularly hard, resistant, long-wearing fillet. The leads from the resistance tab 22 may be led from the vessel in either of the manners shown in Figures 6 and 7, or the lead needle may be cemented directly to the surface of the vessel walls to be led generally longitudinally to the exterior of the vessel.

With the temperature sensing device mounted in the vessel in any of the manners described, electric connection is established between the leads of the resistance tab and a suitable indicating, recording and/or controlling device or instrument. In Figure 9, I have shown a suitable arrangement wherein the needle 60, within the shield 72, is conducted to an instrument or device 84 which is adapted to indicate, by the needle 86 moving over the dial 88 thereof, the temperature sensed by the device 20, 22, 24. This is accomplished, as is customary, as a consequence of the responsiveness of the instrument to the variations in electric resistance in the wire 28 of the tab 22 as induced by variations in the temperature to which the wire is exposed. In the device shown, the needle 86 may suitably comprise a stylus which records the temperature on a replaceable dial face in the form of a paper record. Also, the device 84 includes means for effecting control of thermal applications to the vessel in response to temperature variations of the vessel contents. For example, the instrument 84 may suitably control energization of a solenoid valve 90 which is electrically connected to the instrument and mechanically included in a steam inlet conduit 92 leading to the steam jacket of the renderer or like vessel. Any resistance activated indicator, recorder, controller, or recorder-controller is suitable for the purpose stated, and instuments are commercially available for accomplishing all of the functions described. Generally stated, such instrument translates the resistance variations of the tab 22 into sensible functions for indicating, recording and/or controlling the temperature of the contents of the renderer or like vessel.

In view of the foregoing, it is to be appreciated that the present invention affords novel and improved temperature sensing devices that are fully protected from damage due to shocks, impact and pressure, that are of extremely small size and very readily and economically mounted or installed, that sense solely the temperature of the contents of the vessel with which associated, that are of highly economical manufacture and adapted for long and efficient service. Also, the present invention affords improved manners of mounting temperature sensitive devices in vessels in a very practical and economical manner, wherein the electric leads of the resistance tab are so insulated and disposed as to afford substantial mitigation, if not entire elimination, of extraneous heat or temperature factors that could possibly effect the temperature sensing characteristics of the temperature sensing device of the invention.

While I have shown and described what I regard to be preferred embodiments of my invention, it will be appreciated that variations, changes and modifications may be made therein without departing from the scope of the invention. For example, variations may be made without invention by those skilled in the art with respect to the materials adopted in the construction of the components of the temperature sensing device, variations and changes may be made in the preferred dimensions described and in the manner of mounting the devices, changes may be made in the temperature sensing unit or element adopted, and changes and rearrangements may be effected in the indicating, recording and/or controlling device. Accordingly then, such variations and others fall within the scope of the present invention, as defined by the appended claim.

I claim:

For use in a heated lard rendering vessel having a heavy metallic wall heated by heat applied to the outside of the vessel and adapted on the inside of the vessel to contain animal matter to be rendered which matter is subject to stirring and pounding against said wall, the combination with said wall of a temperature sensing element comprising a layer of dense shock absorbing heat insulating material having its outer surface lying against an imperforate inside surface of the wall and being capable of transmitting through itself to the wall said pounding of the contents of the vessel without substantial injury, a thin resistance tab of substantially smaller area than the area of said layer of heat insulating material mounted on the central part of the inner surface of said layer of insulating material and being thereby insulated thermally from said wall of the vessel, a thin protective metal plate of substantially greater area than said tab overlying said tab, said plate lying in thermal and mechanical contact with the outer surface of said tab and having its margins extending a substantial distance beyond said tab, said extended margins and said plate being spaced throughout inwardly from said wall by said heat insulating material, whereby the resistance tab which is in close thermal contact with the central part of the plate only is in close thermal contact with and responsive to the temperature of the contents of the vessel, and relatively unresponsive to the heat of the wall of the vessel, said extended margins being fastened to said wall, and means for extending an electric circuit from said tab to outside said wall.

References Cited in the file of this patent

UNITED STATES PATENTS

| | | |
|---|---|---|
| 1,294,165 | Reese | Feb. 11, 1919 |
| 1,554,967 | Freeman | Sept. 22, 1925 |
| 2,282,441 | Whitlock | May 12, 1942 |
| 2,292,549 | Simmons | Aug. 11, 1942 |
| 2,322,319 | Ruge | June 22, 1943 |
| 2,346,560 | Crosthwait et al. | Apr. 11, 1944 |
| 2,603,422 | Sargeaunt | July 15, 1952 |
| 2,606,986 | Sweger | Aug. 12, 1952 |
| 2,635,137 | Basham | Apr. 14, 1953 |